United States Patent
Lee et al.

(10) Patent No.: US 8,155,004 B2
(45) Date of Patent: Apr. 10, 2012

(54) MOBILE NETWORK SYSTEM FOR DYNAMICALLY CONTROLLING COMMUNICATION PATH AND METHOD THEREOF

(75) Inventors: Ji-hoon Lee, Cheongiu-si (KR); Jung-ho Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1185 days.

(21) Appl. No.: 11/234,135

(22) Filed: Sep. 26, 2005

(65) Prior Publication Data
US 2006/0067232 A1   Mar. 30, 2006

(30) Foreign Application Priority Data
Sep. 24, 2004   (KR) .................. 10-2004-0076951

(51) Int. Cl.
*H04L 12/28* (2006.01)
*H04L 1/10* (2006.01)

(52) U.S. Cl. ........ 370/235; 370/229; 370/389; 370/392; 370/351; 455/427; 455/436; 709/238; 709/242; 709/202

(58) Field of Classification Search .................. 370/235, 370/238, 229, 392, 389, 351, 328, 217, 338, 370/349, 316, 352; 709/238, 242, 202, 171; 455/436, 427, 432; 340/349, 316, 352, 338
See application file for complete search history.

(56) References Cited

U.S. PATENT DOCUMENTS

| | | | | |
|---|---|---|---|---|
| 6,421,731 | B1 * | 7/2002 | Ciotti et al. | 709/238 |
| 7,295,521 | B2 * | 11/2007 | Choi et al. | 370/238 |
| 7,693,159 | B2 * | 4/2010 | Nishimura et al. | 370/401 |
| 2004/0095891 | A1 * | 5/2004 | Nakagawa | 370/252 |
| 2006/0114850 | A1 * | 6/2006 | Avinash | 370/328 |
| 2006/0250951 | A1 * | 11/2006 | Ueda et al. | 370/217 |
| 2006/0268806 | A1 * | 11/2006 | Meier et al. | 370/338 |

FOREIGN PATENT DOCUMENTS

KR   10-2004-0048528   6/2004

OTHER PUBLICATIONS

Korean Office Action issued on Jul. 3, 2006 with respect to Korean Patent Application No. 10-2004-0076951.

* cited by examiner

*Primary Examiner* — Aung S Moe
*Assistant Examiner* — Jamal Javaid
(74) *Attorney, Agent, or Firm* — Staas & Halsey LLP

(57) ABSTRACT

Disclosed is a mobile network system based on ad hoc on-demand distance vector (AODV) routing algorithm, including: a destination node: a source node for transmitting a data packet to the destination node by following a communication path; and a mobile node for receiving the data packet from a plurality of intermediate nodes located on the communication path, checking hop count numbers for the plurality of intermediate nodes, and establishing a communication path with a first node having a least number of hops and a second node having a most number of hops. Therefore, an optimum changeable communication path is searched in consideration of mobility of the mobile node. In result, communication speed is increased and the lifespan of the network is extended.

16 Claims, 3 Drawing Sheets

(a) AT J Node

| PACKET NO. | NODE INFORMATION | PACKET INFORMATION | HOP COUNT |
|---|---|---|---|
| 1 | A | < A, I > | 0 |
| 2 | A | < A, K > | 0 |
| 3 | E | < A, I > | 4 |

(b) AT F Node

| PACKET NO. | NODE INFORMATION | PACKET INFORMATION | HOP COUNT |
|---|---|---|---|
| 1 | E | < A, I > | 4 |
| 2 | G | < A, I > | 6 |
| 3 | H | < A, I > | 7 |

MOBILE NETWORK SYSTEM FOR DYNAMICALLY CONTROLLING COMMUNICATION PATH AND METHOD THEREOF

CROSS-REFERENCE TO RELATED APPLICATION

This application claims benefit under 35 U.S.C. §119 from Korean Patent Application No. 10-2004-0076951, filed on Sep. 24, 2004, the entire content of which is incorporated herein by reference.

BACKGROUND OF THE INVENTION

1. Field of the Invention

The present invention relates in general to an on-demand ad hoc mobile node, a mobile network system and a method thereof. More specifically, the present invention relates to a mobile node, a mobile network system and a method thereof, capable of optimizing a communication path between a source node and a destination node by the movement of a mobile node.

2. Description of the Related Art

A high speed mobile network for constructing a network environment using radio waves or lights instead of cables has become part of every day life. Because no cable wiring is required, the mobile network can be very easily installed, yet provides a very high speed data communication at a speed of 11 Mbps to up to 54 Mbps over broadband radio waves (on the 2.4 GHz or 5 GHz frequency). Typical examples of mobile network construction technologies are ad-hoc technologies and network infrastructure technologies. Ad-Hoc is a connection method for wireless LANs that requires no base station, so that data transmission between mobile computers such as notebook computers can be done with the wireless LAN only. The alternative of ad-hoc is infrastructure, with an Access Point (AP) that functions as a bridge between existing cable networks.

Mobile nodes in an ad-hoc network perform direct communication operations with each other, so connections are still possible in places where no stable framework such as cable LANs or wireless access points are available.

Ad-hoc network routing protocols usually use ad hoc on-demand distance vector (AODV) routing algorithm and proactive algorithm.

According to the proactive algorithm, routing information is periodically broadcasted, so that every node can have the network information. On the other hand, the AODV routing algorithm is a reactive routing protocol, meaning that it establishes a route to a destination node only on demand of a source node. Because the proactive routing protocols periodically transmit a control message for building and maintaining routing tables independently of the data transmission time, they often cause major overhead for network traffic. In contrast, the AODV routing protocol establishes a routing path only on demand, so it creates no extra network overhead. When a link fails, a routing path can be easily recovered and reestablished. Because of these advantages, AODV routing is preferred.

FIG. 1 is a diagram illustrating a configuration of an ad-hoc mobile network system based on AODV routing algorithm. As shown in FIG. 1, a communication path (or routing path) between a source node 1 and a destination node 6 is established, and nodes 2 to 5 exist on the path. To establish a communication path between the node 1 and the node 6, the node 1 broadcasts a route request message (RREQ) to its peripheral nodes. If one of intermediate nodes (i.e., one of nodes 2 to 5) having route information to a destination node or the destination node (i.e., node 6) receives the route request message, a route reply message (RREP) is unicasted into a route where the route request message is transferred. When the node 1 receives the route reply message, a communication path between the node 1 and the node 6 is established.

As shown in FIG. 1, it is also possible that a new node (i.e., node 7) enters the communication range of the node 1. If a new communication path via the node 7 is established between the node 1 and the node 6, the number of intermediate nodes (or hops) is much less than that of the old communication path via the node 2 to the node 6. This feature increases transmission (communication) speed and reduces a possibility of link failure due to the separation of an intermediate node or an exhausted battery.

However, the disadvantage of the related art AODV routing is that the communication path cannot be changed until an originally established communication path is failed. This means that a new node, if there is, is not used very effectively.

In addition, if the number of intermediate nodes is very large, there is a high possibility that one of the intermediate nodes can be separated or battery is soon exhausted, which only causes the link failure. When this occurs, the source node must go through a route searching procedure in order to recover a path. This creates extra traffic for communication (i.e., overhead). Besides, since packet transmission is not possible during the path reestablishment process, it resultantly causes significant inconvenience for users.

SUMMARY OF THE INVENTION

Additional aspects and/or advantages of the invention will be set forth in part in the description which follows and, in part, will be apparent from the description, or may be learned by practice of the invention.

According to an embodiment of the present invention, it is provided a mobile node and a method for increasing communication speed between a source node and a destination node and reducing link failures, which are accomplished by checking a data packet from a plurality of intermediate nodes on a communication path between the source node and the destination node and intervening in the communication path.

According to an embodiment of the present invention, it is provided a mobile network system and a method thereof, in which if a mobile node moves from place to place the system is capable of reestablishing an optimum communication path having the least number of intermediate nodes (or hops) between a source node and a destination node, thereby increasing communication speed and reducing the risk of link failure.

According to another embodiment of the present invention, it is provided a mobile node forming an ad hoc on-demand distance vector (AODV) network, including: a mobile communication module to perform data communication with a predetermined number of peripheral nodes that are communicable; a packet information detector to detect packet information contained in a header of a data packet from each of the peripheral nodes through the mobile communication module; a hop count detector to detect hop count information contained in the header of the data packet; and a controller, to check hop count numbers for the plurality of peripheral nodes if packet information detected in each data packet from the plurality of peripheral nodes are identical, and to control the mobile communication module to establish a communication path with a first node having a least number of hops and a second node having a most number of hops.

According to an embodiment of the present invention, the mobile node further includes: a memory to store and update information about the peripheral nodes that transmitted the data packet, packet information about the data packets from the peripheral nodes, and hop count information of the peripheral nodes. In this case, the controller selects the first node and the second node based on the information stored in the memory.

Also, the mobile communication module transmits a route change request message to the first node, and a route change message to the second node, to establish a communication path with the first node and the second node, respectively.

The controller establishes the communication path with the first node and the second node if a difference of hop count between the first node and the second node is greater than a predetermined value.

Another aspect of the present invention provides a mobile network system based on ad hoc on-demand distance vector (AODV) routing algorithm, including: a destination node: a source node to transmit a data packet to the destination node by following a predetermined communication path; and a mobile node to receive the data packet from a plurality of intermediate nodes located on the communication path, to check hop count numbers for the plurality of intermediate nodes, and to establish a communication path with a first node having a least number of hops and a second node having a most number of hops.

Another aspect of the present invention, the mobile node records, in predetermined time unit, information about intermediate nodes that transmitted the data packet, source node information and destination node information contained in a header of the data packet, and information about the hop count, and selects the first node and the second node based on the recoded information.

Still another aspect of the present invention provides a mobile network system based on ad hoc on-demand distance vector (AODV) routing algorithm, including: a mobile node, which receives data packets from a plurality of peripheral nodes, and among the received data packets if there exists a plurality of data packets having the same source node and the same destination node, checks hop count numbers for the peripheral nodes that transmitted the same data packet, and establishes a communication path with a first node having a least number of the hop count and with a second node having a most number of the hop count.

Yet another embodiment of the present invention provides a method for controlling a communication path in a mobile network system, the method including: making a decision as to whether data packets having the same packet information are received from a plurality of peripheral nodes; checking hop count numbers for each of the plurality of peripheral nodes if the data packets having the same packet information are received from the plurality of peripheral nodes; and establishing a communication path with a first node having a least number of hops and a second node having a most number of hops.

The method further includes: receiving a data packet from a predetermined peripheral node; detecting packet information contained in a header of the received data packet; and recording information about the peripheral node that transmitted the data packet, the packet information, and hop count information of the peripheral node.

The decision making includes: receiving a data packet from a predetermined peripheral node; detecting packet information contained in a header of the received data packet; and checking whether a data packet having the same packet information as the detected packet information is already received.

The operation to establish the communication path with the first node and the second node, includes: deciding whether a difference of hop count between the first node and the second node is greater than a predetermined value according to an embodiment of the present invention.

In exemplary embodiment of the present invention, the packet information is composed of source node information and destination node information of the data packet, and the hop count is the number of intermediate nodes existing between the source node and the peripheral node(s) that transmitted the data packet.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 4A and 4B illustrate database of a mobile node in FIG. 2, containing information on peripheral nodes.

DETAILED DESCRIPTION OF THE PREFERRED EMBODIMENTS

Figure 1:
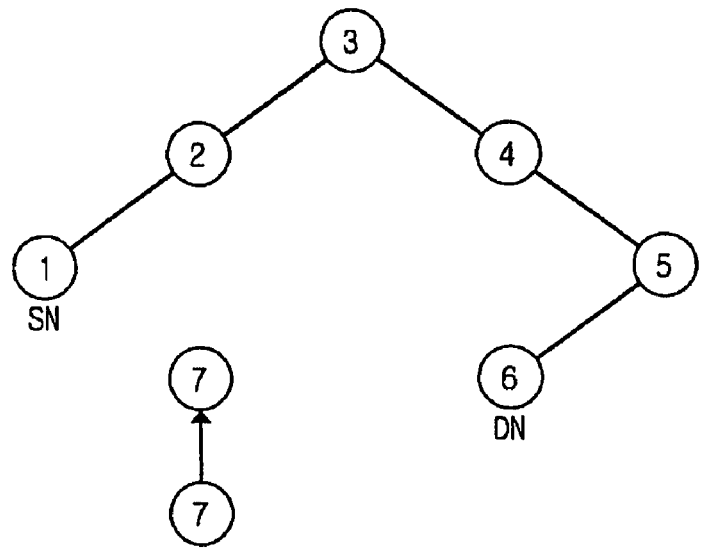
FIG. 1 is a diagram illustrating a configuration of a related art mobile network system based on AODV routing algorithm.

Reference will now be made in detail to the embodiments of the present invention, examples of which are illustrated in the accompanying drawings, wherein like reference numerals refer to the like elements throughout. The embodiments are described below to explain the present invention by referring to the figures.

A preferred embodiment of the present invention will be described herein below with reference to the accompanying drawings.

Figure 2:
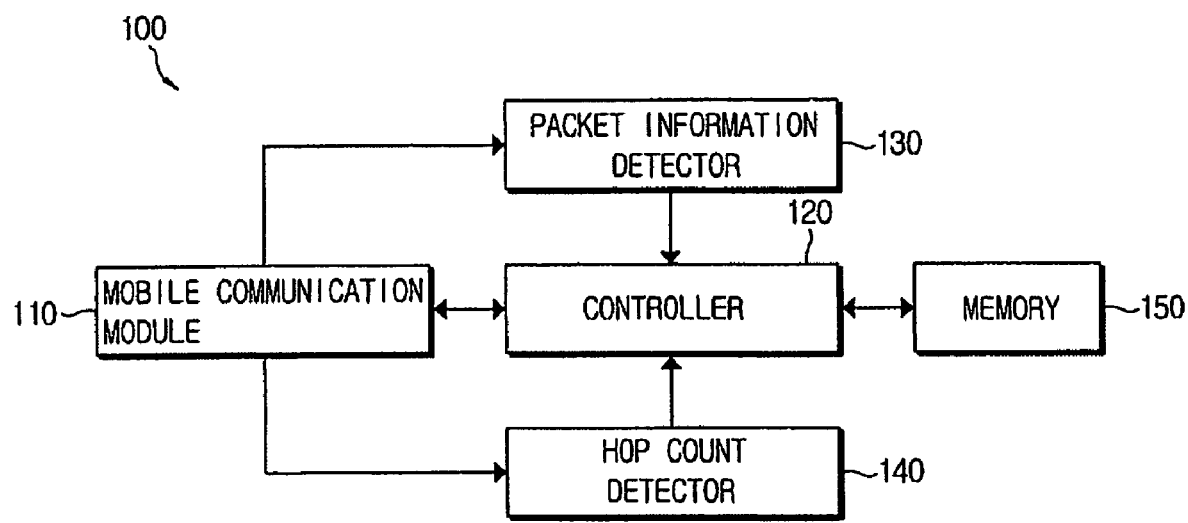
FIG. 2 is a schematic block diagram of a mobile node according to one embodiment of the present invention.

FIG. 2 is a schematic block diagram of a mobile node according to an embodiment of the present invention. As shown in FIG. 2, the mobile node 100 includes a mobile communication module 110, a controller 120, a packet information detector 130, a hop-count detector 140, and a memory 150.

The mobile communication module 110 receives a data packet from its peripheral nodes. It can overhear not only a broadcasted packet from other nodes but also a data packet being transmitted to a destination node. In an ad-hoc network, by its nature as a mobile network, communication between nodes is performed wirelessly, so any peripheral node within a predetermined communication range is able to overhear the transmitted data packet.

The packet information detector 130 checks packet information contained in the header of a data packet received through the mobile communication module 110. The packet information is usually composed of IP addresses of a source and a destination node.

The hop-count detector 140 detects hop count of peripheral nodes that participated in the data packet transmission to the mobile communication module 110. Hop count means the number of intermediate nodes that locates on a communication path between a source node and a peripheral node. In other words, a node having received the data packet records the number of intermediate nodes existing between the source and itself in the header of the data packet, and transmits the data packet to a next node. The hop-count detector 140 detects a TTL (Time-To-Live) number contained in the header of the data packet received from a peripheral node, and compares the TTL with that of the source node to detect hop count. The TTL number in the transmitted packet from the source node decrements by 1 as it goes through each node. Therefore, by comparing the TTL number with another TTL number provided from a different node on the same communication path, the hop-count detector 140 can determine whether to change the current communication path.

When the data packet is transmitted from a peripheral node, the controller 120 checks the packet information and the hop count, and stores those information together with information on the node that sent the data packet in the memory 150. If a data packet is transmitted from a different peripheral node after the lapse of time, the controller 120 checks the packet information of this newly arrived data packet, and compares it with the pre-stored information in the memory 150. If the packet information, that is, the IP addresses of the source node and the destination node, is identical, the controller 120 recognizes that the data packet has been transmitted from two intermediate nodes locating on the same communication path between the source node and the destination node.

The controller 120 receives a data packet for a predetermined amount of time, and records information of the data packet in the memory 150. Based on the recorded information, the controller 120 is able to check whether the data packets provided from at least two different nodes having the same packet information.

Also, the controller 120 is able to recognize whether the data packet is transmitted from the same or more than two different intermediate nodes by checking not only IP address but also MAC (Media Access Control) address contained in the header of each data packet. That is, if the IP addresses are same but the MAC addresses are different, the controller 120 decides that different intermediate nodes on the same communication path have transmitted the data packets. On the other hand, if both IP addresses and MAC addresses coincide with each other, the controller 120 decides that the same node sent the data packet twice. In this case, if the MAC address designates the mobile node 100, the controller 120 transmits the corresponding data packet to a destination node, but if not, the controller 120 discards the data packet since it has already overheard the packet in question.

Therefore, if it turns out that more than two intermediate nodes transmitted data packets having the same packet information, the controller 120 checks hop count numbers for the intermediate nodes. Accordingly, the controller 120 selects a first node having the least number of hops and a second node having the most number of hops, and establishes a communication path between the first node and the second node. Therefore, as the mobile node intervenes in these communication paths between the source node and the destination node, it is possible to change the original communication path.

Alternatively, the controller 120 can set the mobile node 100 to intervene only if the difference in hop count numbers between mobile nodes is greater than a predetermined value. That is, the controller 120 controls the mobile node to establish a communication path between the first and the second node if the difference in hop count numbers between the first node and the second node exceeds a predetermined threshold.

Before establishing communication paths between the first and second nodes, the controller 120 controls the mobile communication module 110 to transmit a route change request packet to the first node, requesting to change the old communication path to a new communication path established by the mobile node 100. As such, the first node changes the MAC address of a next transmitting data packet and transmits the data packet to the mobile node 100. Then, the controller 120 controls the mobile communication module 110 to transmit a route change packet to the second node, informing that the path has been changed. It is not always required to transmit a route change packet though. Instead, the route change information can be transmitted together with a next data packet.

Figures 3, 4:
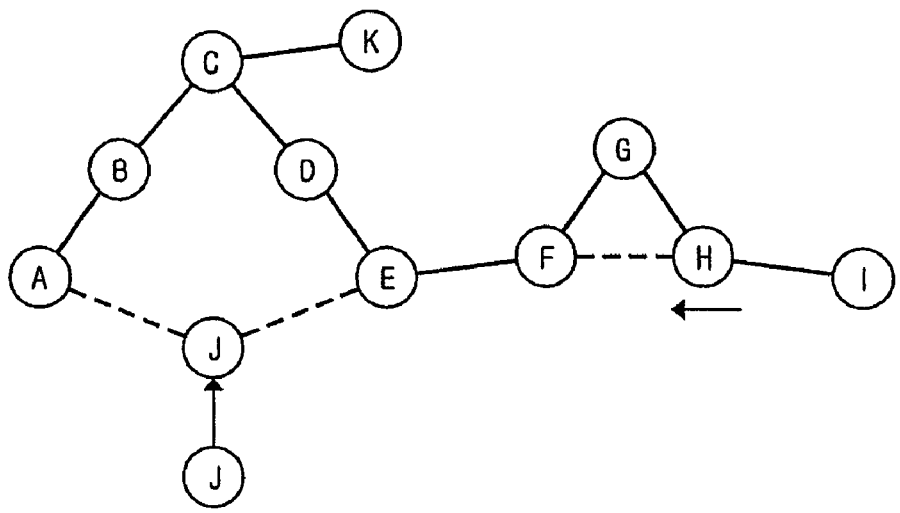
FIG. 3 is a diagram illustrating a configuration of a mobile network system of the present invention, which includes a mobile node in FIG. 2.

FIG. 3 is a diagram illustrating the configuration of a mobile network system, in which the mobile node in FIG. 2 is used. Referring to FIG. 3, a communication path composed of nodes B to H is established between a source node A and a destination node 1. Suppose that node J moved into the communication ranges of the node A and the node E. Then, the node J is put in the position where it can overhear data packets from both node A and node E. By checking packet information of a data packet it overheard, the node J recognizes that the node A and the node E are of the same communication path. Through the intervention of the node J in the communication path between the node A and the node E, the old communication path via the nodes B to D has now changed to a new, short communication path through only the node J.

In another case, an intermediate node on the established communication path sometimes moves to other place, thereby shortening the communication path. For instance, when node H moves in the direction of the arrow, node F becomes capable of overhearing a data packet from node H. In this case, nodes E, G and H become peripheral nodes for transmitting data packets having the same packet information. The node E will be a node having the least number of hops, whereas the node H will be a node having the most number of hops. Thus, a new communication path through the nodes E, H and F only is established.

FIGS. 4A and 4B illustrate database structures stored in the memory 150 of the mobile node 100. FIG. 4A shows a database for use in the node J of the mobile network system in FIG. 3. Referring to FIG. 4A, the node J receives a first and a second packet from the node A, and a third packet from the node E. Since the destination of the second packet is the node K, which is different from the other packets, the second packet is discarded right away. Meanwhile, the first packet and the third packet have the same packet information, so that the hop count numbers for the node A and the node E (the nodes that transmitted the first and third packets) are checked, respectively.

In this case, because the node A is a source node, its hop count number is 0, whereas the hop count number of the node E is 4. As such, the node J transmits a route change request packet to the node A, and intervenes in the communication path between the node A and the node E. As a result, the old communication path via the nodes B, C and D is now changed to a new communication path through the node J only. Naturally, the communication speed increases, and the risk of link failure decreases markedly.

FIG. 4B illustrates a database for use in the node F. Referring to FIG. 4B, the node F receives a first, a second and a third packet from the node E, the node G, and the node H, respectively. The packet information of each packet says that the node A is the source node, and the node I is the destination node. So the number of hop counts of the node E, the node G, and the node H are checked, respectively. According to the database in FIG. 4B, the node E has the least number of hops, i.e., 4, and the node H has the most number of hops, i.e., 7. As a result, the old communication path via the nodes F, G and H is now changed to a new communication path through the node H only. In this case, however, the old communication path between the node E and the node F is retained, so the route change request packet might not be transferred separately.

Another embodiment of the present invention suggests that if a difference in hop count numbers between peripheral nodes is less than a predetermined threshold, the existing communication path may be kept. That is to say, by setting an experimental threshold, it becomes possible to prevent extra network traffic. For instance, suppose that the predetermined threshold in FIG. 3 is 3. Then, the difference in the hop count numbers between the node A and the node E is 4. Therefore, the new communication path via the node J is established. In contrast, the difference in the hop count numbers between the node E and the node H is 3. Therefore, the old communication path via the nodes G and H is retained.

Figure 5:
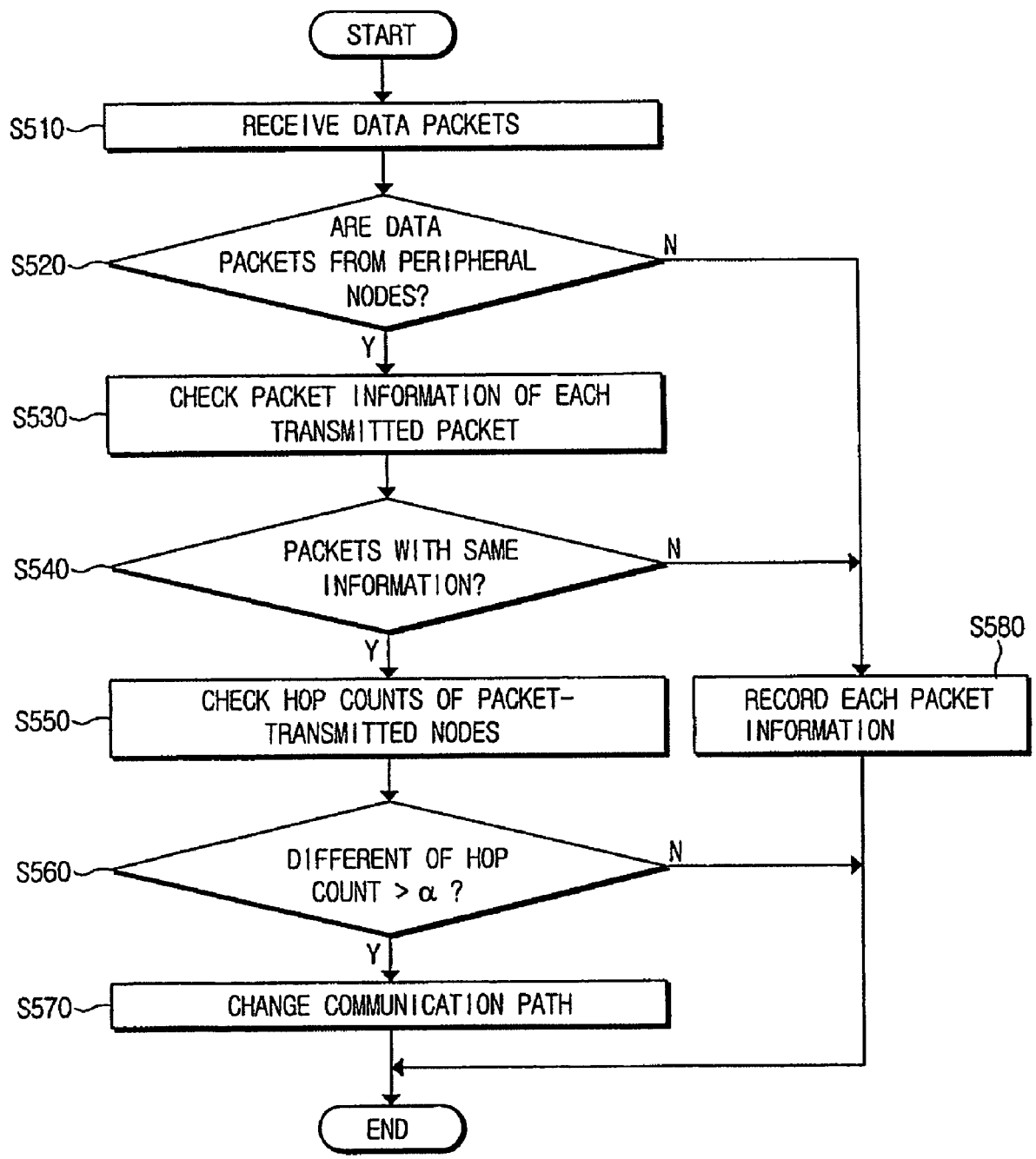
FIG. 5 is a flow chart explaining a mobile communication method according to one embodiment of the present invention.

FIG. 5 is a flow chart explaining a mobile communication method in accordance with one embodiment of the present invention. Referring to FIG. 5, one of mobile nodes in the AODV network system receives a data packet from its peripheral node through overhearing (S510). Then, it is checked whether there already exists a data packet received, and whether data packets are being transmitted from a plurality of peripheral nodes, respectively (S520). If no data packet has been received previously, packet information of a newly received data packet is stored, and the mobile node enters standby mode for a predetermined time (S580).

However, if data packets have been transmitted from a plurality of peripheral nodes, the mobile node checks packet information contained in the header of each packet (S530), to find a packet of the same packet information (S540). At this time, it is preferable to search a packet that has the same source node and destination node, yet different MAC address.

If a packet of the same packet information does not exist, the mobile mode stores packet information of all data packets that have been received to that point, and enters standby mode for a predetermined time (S580).

However, if a packet of the same packet information exists, the mobile node checks the hop count number of each peripheral node that transmitted a packet (S550). Preferably, it is checked whether the difference in the hop count numbers between a first node having the least number of hops and a second node having the most number of hops exceeds a predetermined threshold ($\alpha$) (S560).

If the difference in the hop count numbers is greater than the predetermined threshold ($\alpha$), a new communication path between the first node and the second node is established (S570). In detail, a route change request packet is transmitted to the first node and a route change packet is transmitted to the second node, so that the old communication path between the first node and the second node is changed to a new transmission path via the mobile node.

Therefore, communication can be performed through this new transmission path having a reduced number of intermediate nodes between the source node and the destination node.

As set forth above, according to the mobile network system of the present invention, upon the creation of the optimum path following the movement of the mobile node, communication is performed through the new optimum path having a reduced number of intermediate nodes thereon. As a result, communication speed is increased and the possibility of link failure due to the separation of an intermediate node or an exhausted battery or a malfunction can be reduced markedly. Also, by restricting the change of communication path only to a case that the number of intermediate nodes is less than the predetermined number, it becomes possible to prevent the creation of unnecessary changes of the path.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A mobile network system based on an ad hoc on-demand distance vector (AODV) routing algorithm, the system comprising:
   a destination node:
   a source node to transmit a data packet to the destination node by following a first communication path;
   a plurality of intermediate nodes located on the first communication path; and
   a mobile node not located on the first communication path to receive the data packet from each of the plurality of intermediate nodes, to check the data packet received from each of the plurality of intermediate nodes, to discard the data packets having a packet information different from the other data packets, to check hop count numbers for each of the plurality of intermediate nodes that transmitted the data packet having same packet information, and to replace at least a portion of the first communication path with a new communication path between a first node having a minimum hop count and a second node having a maximum hop count by acting as an intermediate node between the first node and the second node, wherein the hop count represents a number of intermediate nodes that are located on the first communication path between the source node and a plurality of present nodes that transmit the data packet to the mobile node when the mobile node moves into a communication range of the plurality of present nodes.

2. The system according to claim 1, wherein the mobile node records, in predetermined time unit, information about intermediate nodes that transmitted the data packet, source node information and destination node information contained in a header of the data packet, and information about the hop count, and selects the first node and the second node based on the recorded information.

3. A mobile network system based on an ad hoc on-demand distance vector (AODV) routing algorithm and including a source node, a destination node, and a plurality of intermediate nodes respectively making up a first communication path, the system comprising:
   a mobile node not located on the first communication path that receives data packets from each of a plurality of peripheral nodes located on the first communication path, checks the data packet received from each of the plurality of peripheral nodes, discards the data packets having a packet information different from the other data packet, checks hop count numbers for the peripheral nodes that transmitted the same data packet among the received data packets if there exists a plurality of data packets having the same source node and the same destination node, and replaces at least a portion of the first communication path with a new communication path between a first node having a minimum hop count and a second node having a maximum hop count by acting as an intermediate node between the first node and the second node, the hop count representing a number of intermediate nodes that are located on the first communication path between the source node and the plurality of peripheral nodes that transmit the data packet to the mobile node when the mobile node moves into a communication range of the plurality of peripheral nodes.

4. A mobile node forming an ad hoc on-demand distance vector (AODV) network including a source node and a destination node, the mobile node comprising:
- a mobile communication module to perform data communication with a number of communicable intermediate nodes on a first communication path, the mobile node not being located on the first communication path;
- a packet information detector to detect packet information contained in a header of a data packet from each of the intermediate nodes through the mobile communication module;
- a hop count detector to detect hop count information contained in the header of the data packet, the hop count representing a number of intermediate nodes that are located on the first communication path between the source node and a plurality of present nodes that transmit the data packet to the mobile node when the mobile node moves into a communication range of the plurality of present nodes; and
- a controller, to check the data packet received from each of the plurality of the intermediate nodes, to discard the data packets having a packet information different from the other packets, to check hop count numbers for each of the plurality of intermediate nodes that transmitted the data packets having same packet information, and to control the mobile communication module to replace at least a portion of the first communication path with a new communication path between a first node having a minimum hop count and a second node having a maximum hop count using the mobile node as an intermediate node, if packet information detected in each data packet from the plurality of peripheral nodes is identical.

5. The mobile node according to claim 4, further comprising:
- a memory to store and update information about the peripheral nodes that transmitted the data packet, packet information about the data packets from the peripheral nodes, and hop count information of the peripheral nodes, and
- wherein the controller selects the first node and the second node based on the information stored in the memory.

6. The mobile node according to claim 4, wherein the mobile communication module transmits a route change request message to the first node.

7. The mobile node according to claim 4, wherein the mobile communication module transmits a route change message to second node.

8. The mobile node according to claim 4, wherein the controller establishes the communication path with the first node and the second node if a difference of hop count between the first node and the second node is greater than a predetermined value.

9. The mobile node according to claim 4, wherein the packet information is composed of source node information and destination node information of the data packet.

10. A method for controlling a first communication path between a source node and a destination node in a mobile network system, the method comprising:
- receiving a data packet from each of a plurality of peripheral nodes located on the first communication path;
- checking the data packet received from each of the plurality of peripheral nodes and discarding the packets having packet information different from the other data packets;
- checking hop count numbers for each of the plurality of peripheral nodes that transmitted the data packets having the same packet information; and
- replacing at least a portion of the first communication path with a new communication path between a first node having a minimum hop count and a second node having a maximum hop count using a node not located on the first communication path as an intermediate node, wherein the hop count represents a number of intermediate nodes that are located on the first communication path between the source node and the plurality of peripheral nodes that transmit the data packet to the mobile node when the mobile node moves into a communication range of the plurality of peripheral nodes.

11. The method according to claim 10, wherein the packet information is composed of source node information and destination node information of the transmitted data packet.

12. The method according to claim 10, further comprising:
- receiving a data packet from a predetermined peripheral node;
- detecting packet information contained in a header of the received data packet; and
- recording information about the peripheral node that transmitted the data packet, the packet information, and hop count information of the peripheral node.

13. The method according to claim 10, wherein the decision making comprises:
- receiving a data packet from a predetermined peripheral node;
- detecting packet information contained in a header of the received data packet; and
- checking whether a data packet having the same packet information as the detected packet information is already received.

14. The method according to claim 10, wherein the establishing the communication path with the first node and the second node comprises:
- deciding whether a difference of hop count between the first node and the second node is greater than a predetermined value.

15. The method according to claim 10, further comprising:
- transmitting a route change information packet to the second node.

16. The method according to claim 10, further comprising:
- transmitting a route change information added to a next data packet.

* * * * *

UNITED STATES PATENT AND TRADEMARK OFFICE
CERTIFICATE OF CORRECTION

PATENT NO. : 8,155,004 B2
APPLICATION NO. : 11/234135
DATED : April 10, 2012
INVENTOR(S) : Ji-hoon Lee et al.

It is certified that error appears in the above-identified patent and that said Letters Patent is hereby corrected as shown below:

Title Page Column 1 item (75); (Inventors), Line 1, Delete "Cheongiu-si" and insert -- Cheongju-si --, therefor.

Signed and Sealed this
Nineteenth Day of June, 2012

David J. Kappos
*Director of the United States Patent and Trademark Office*